Figure 1:
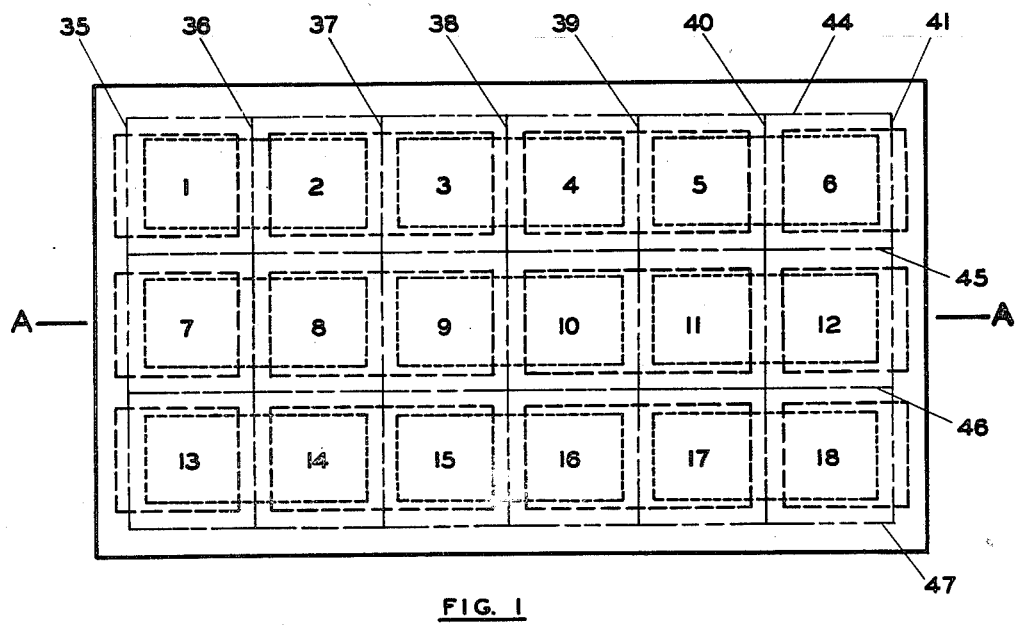

Nov. 20, 1945.   A. J. DEYRUP   2,389,420

MANUFACTURE OF CAPACITORS

Filed Oct. 4, 1943

INVENTOR.
ALDEN J. DEYRUP
BY
*E. H. O'Brien*
*Attorney.*

Patented Nov. 20, 1945

2,389,420

UNITED STATES PATENT OFFICE 2,389,420

MANUFACTURE OF CAPACITORS

Alden J. Deyrup, Westfield, N. J., assignor to E. I. du Pont de Nemours & Company, Wilmington, Del., a corporation of Delaware Application October 4, 1943, Serial No. 504,885

3 Claims. (Cl. 75—22)

This invention relates to the manufacture of capacitors or electrical condensers, and is particularly directed to a new and improved method for fabricating fixed capacitors of the type described and claimed in copending applications, Serial No. 504,882, filed October 4, 1943; and Serial No. 504,883, filed October 4, 1943. As described more particularly in the latter of said copending applications, electrical capacitors of this type are manufactured by building up alternate unfired layers of vitreous dielectric enamel and powdered silver, and firing the resulting blocks to a unitary monolithic structure while positioned on a base or support to which the alternately applied layers do not adhere. During this firing step they are free to shrink without the development of strains or stresses which would tend to distort or crack the fired monolithic capacitor structure.

I have now discovered that the general manufacturing process described in copending application, Serial No. 504,883, filed October 4, 1943, utilizable for producing the capacitors of copending application, Serial No. 504,882, filed October 4, 1943, may be practiced by building up the alternate layer structure of the electrical capacitors in blocks consisting of as many as 50 to 100 individual electrical capacitor units, or more, staggering successive electrode layers, all these units being built up at once, and then cutting them apart into the individual electrical capacitor units before the alternate layer structure of vitreous enamel and powdered silver is fired to form the desired unitary monolithic capacitor. By the use of this procedure, constituting a modification of that disclosed in my previously referred-to copending applications, capacitors of this type may be manufactured at much lower individual cost because the method permits a considerable increase in the number of finished units which can be turned out in a given time by any specified number of operators. Moreover, by constructing the capacitor units in blocks comprising a large number of individual units, for example blocks containing from 50 to 100 units, the materials necessary to produce the finished capacitor may be utilized much more economically than when constructing electrical capacitors individually.

It is, accordingly, one object of this invention to render available to the industry a process for the manufacture of electrical capacitors, more particularly the unitary monolithic capacitors of the copending applications, filed simultaneously herewith, which method permits the fabrication of a large number of individual units at the same time, thus introducing a considerable saving in labor cost, as well as permitting more economical utilization of the materials necessary. Another object of this invention is to provide a method by which electrical capacitor units of the type described are built up in multi-unit blocks, and then cut apart, prior to firing, to form the individual electrical capacitor units formed of fired ceramic materials. These and still other objects of my invention will be apparent from the ensuing disclosure of certain preferred embodiments thereof.

Figure 2:
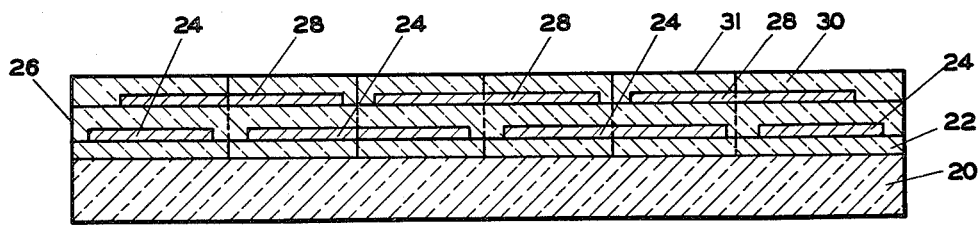

My invention is best described with reference to the annexed drawing wherein Figure 1 is a diagrammatic view in plan illustrating the method in which the various alternate layers to be subsequently fired to form my improved ceramic capacitors are built up in blocks comprising a large number of individual units. Figure 2 is a sectional view taken on the line A—A of Figure 1 showing the various layers comprising the multi-unit structure built up on a rigid base or support.

Referring particularly to the figures of the drawing, I first provide a rigid base 20 which may be formed of any suitable material such as metal, ceramic ware, porcelain, or in some instances even of materials such as paper and wood. This base is first covered uniformly over its entire area with a layer of dielectric vitreous enamel 22. This layer is usually sprayed on the supporting base 20 as a suspension of the powdered vitreous enamel composition in a suitable vehicle. However, it may be applied in any other suitable manner such as by forcing a suspension of the vitreous enamel in a suitable vehicle through the interstices of a stencil by means of a squeegee or other similar implement, i. e., the so-called silk screen squeegee mode of application, well known in the ceramic industry. However I prefer to spray the suspension of vitreous enamel on the supporting base 20.

The vehicles of copending application Serial No. 504,883, filed October 4, 1943, may be utilized to suspend the vitreous enamels. Those vitreous enamels of high dielectric properties disclosed in copending application Serial No. 504,888, filed October 4, 1943, will be found very satisfactory for use in my process.

After layer 22 dries by evaporation of the vehicle, I next apply, on top of the vitreous enamel layer 22, a number of powdered metallic silver areas, these forming, when fired, one of the plates or silver layer electrodes of each individual capacitor. These layers are represented by the numerals 24 and are, as shown, spaced from each other throughout both the length and breadth of the rigid base 20 covered with dielectric enamel layer 22. The metallic silver comprising these electrodes, layer 24, is preferably applied by means of the screen stencil method, utilizing a squeegee. In this method a suspension of metallic silver powder suspended in a suitable vehicle is forced through the stencil, suitable portions of which are masked to prevent the passage of the metallic silver, so as to provide the spaces between the electrode plate areas.

After this set of metallic silver layers, destined to form one electrode plate in each of the electrical capacitors, is dried by evaporation of vehicle, a second coat of dielectric vitreous enamel is sprayed on the ceramic base. This is the layer 26 which extends throughout the entire extent of the rigid supporting base 22. As shown more particularly in Figure 2, the second coat of vitreous enamel suspension covers the first set of electrodes 24 and levels up the spaces between them. This vitreous enamel dielectric layer is preferably applied by spraying the same suspension of vitreous enamel in vehicle used to form the enamel layer 22.

After the vitreous enamel layer 26 has dried by evaporation of the vehicle, there is then applied a second set of silver electrode areas on top of the vitreous enamel layer 26. This is the set represented by the numerals 28 in the drawing and, as shown, these layers are spaced from each other both throughout the length and breadth of the rigid supporting base, similar to the spacing provided between the first electrode areas 24. However, as shown, the spaces between the individual second electrode areas 28 do not correspond in position with the spaces between the individual first electrode areas 24. The second electrode areas 28 are so positioned as to overlap and cover, at least throughout one dimension, the spaces between the first set of electrode areas 24. These electrode areas are formed, as the first, by metallic silver suspended in a suitable vehicle. Preferably these areas 28 are applied, as first electrode areas 24, by use of the screen stencil method, the suspension of silver metal and vehicle being forced through the stencil onto the supporting vitreous enamel layer 26.

After the second set of metallic silver electrode areas has dried by evaporation of the vehicle, there is now applied a third layer of vitreous enamel 30. This layer comprises vitreous enamel having dielectric properties suspended in a suitable vehicle, and is preferably applied by spraying although other methods such as the squeegee screen stencil method might be utilized. As shown more particularly in Figure 2, this vitreous enamel layer 30 levels up the spaces between the metallic silver electrode areas 28, so that the upper surface 31 is level and unbroken.

After the third vitreous enamel layer has dried, a third set of silver electrode areas might be applied, these areas being positioned on the supporting base 20 so as to overlie but otherwise substantially coincide in area and position with the first set of metallic silver electrode areas 24. The drawing does not show this third set of silver electrode areas however, nor does it show the layer of vitreous enamel dielectric, similar to layers 22, 26 and 30, which might be applied thereover. In order that the invention may be fully understood it is not necessary that additional layers be illustrated, but it is apparent that any number of individual layers of silver layer electrodes, and any number of interspersed layers of vitreous enamel dielectric, might be built up on the supporting base 20. Succeeding silver electrode areas would correspond in area and position alternately, i. e., the third silver electrode area (not illustrated) would correspond approximately in area and position with the first silver electrode areas 24, while the fourth silver electrode area (not shown) would correspond in area and extent with the second silver electrode areas 28. In this way any number of sets of electrode plates and any number of separating layers of vitreous enamel dielectric might be built up. Alternate layers of silver electrodes in each unit are connected at their edge portions, as subsequently explained, in order to provide for electrical communication therebetween as is usual in multiplate electrical capacitors.

In constructing the usual ceramic capacitor of unitary monolithic type, such as described and claimed in my previously-referred to copending application, Serial No. 504,882, filed October 4, 1943, it is usual to build up a total of from 10 to 20 effective layers of vitreous enamel dielectric with the correspondingly necessary number of metallic silver electrode layers. Frequently the electrical capacitor may comprise as many as 100 individual electrode layers, the number used depending on the physical size and capacitance desired in each unit being constructed. As previously noted, the first, third, fifth, seventh, ninth, etc. of these are placed in electrical communication to provide one set of electrodes, while the second, fourth, sixth, eighth, tenth, etc., layers of silver are placed in electrical communication to form the second set of electrodes of the electrical capacitor, as is customary in the usual type of multi-plate electrical capacitors. As the showing of more than two sets of metallic silver electrode areas, together with their interposed vitreous enamel dielectric layers, in the drawing would result in obscurity and would render it difficult to understand the construction, the drawing has been limited to the two silver layers and three vitreous enamel dielectric layers. It should be understood, however, that in practice, ordinarily the ceramic capacitor will comprise many more metallic silver and dielectric layers than the two illustrated. A total of 10, 20, or more such metallic layer electrodes is very common in commercial capacitors, and these silver layers are connected, as previously described, alternately, in accordance with the usual practice in electrical capacitors, thereby providing the electrodes of the capacitor structure.

After the multiple electric capacitor unit structure has been built up in the manner described there results a large cake or block which may be cut apart as at the lines 35, 36, 37, 38, 39, 40, 41, and at 44, 45, 46, and 47, whereby the large block is subdivided into 18 small blocks each one constituting a complete unfired capacitor unit with alternately positioned silver layer electrodes exposed at the respective opposite ends of each of the small blocks. The small blocks formed by cutting the large block or cake apart on the lines indicated are numbered respectively 1 to 18 in Figure 1 of the drawing. The metallic silver electrode layers, cut to expose the metal layers cut at each respective end of two opposite ends of the small blocks, may then be painted with a suspension of powdered silver in a suitable vehicle. As the cutting lines, by reason of the staggered relationship of the electrode areas 24 and 28, cut through alternate layers of metallic silver, it is evident that by painting the powdered silver suspension on the end sections of the small individual blocks electrical communication is provided between alternate, superposed, metallic electrode layers. In this way electrical communication is provided by the silver paint between alternate electrode layers or plates, as in the usual multiplate electrical capacitor construction, to provide the two electrodes of the capacitor. Connecting wires or terminals may later be attached, after completion of the units by firing, to the silver layers on the end surfaces of the blocks, thereby permitting positioning of the electrical capacitors in electrical and radio circuits.

After being cut apart to form the individual blocks 1 to 18 shown in the drawing and, preferably, after the exposed ends of the parallel electrode layers are joined by the silver paint or suspension on the opposite end surfaces of the capacitor blocks, the blocks are fired to single unitary monolithic structures utilizing one of the procedures described in copending application, Serial No. 504,883, filed October 4, 1943. This may involve, in brief, transferring the built-up blocks of unfired layers of vitreous enamel dielectric and metallic silver from the temporary supporting base 20 to a second temporary supporting base, this second temporary supporting base being provided, however, with a non-adhesion layer positioned between the lowermost layer of vitreous enamel dielectric and the base. The raw or unfired capacitor units are then fired while positioned on this second temporary supporting base, thereby forming the monolithic unitary ceramic electrical capacitor structures described and claimed in copending application, Serial No. 504,882, filed October 4, 1943. As will be apparent from a modification of the method described in above-mentioned copending application Serial No. 504,883, filed October 4, 1943, the temporary base 20 shown in the drawing may also be utilized as the base on which the unfired layers are fired to form the unitary monolithic capacitor structure provided, however, that there is positioned between that base and the lowermost layer of dielectric material 22 a non-adhesion layer and a separation layer, more fully described in the specification of said copending application. As the firing of the individual blocks to form the unitary monolithic ceramic condensers constitutes no part of the invention covered in the present application, said copending applications should be consulted for further details of my method of firing.

By thus forming a large number of individual capacitor units simultaneously (the drawing illustrating only the manufacture of 18, but it is of course evident that a much larger number could be simultaneously manufactured, if desired), considerable savings in the labor of constructing the capacitors are possible as well as efficient utilization of dielectric and silver materials with little or no waste. Moreover my improved method is conducive to the maintenance of improved accuracy, insofar as the capacitance of the resulting units is concerned, and is flexible and generally applicable for all types of vitreous ceramic dielectric materials. It is indeed surprising that such a delicate series of extremely thin layers, alternately of vitreous enamel dielectric and metallic silver, could be cut apart to provide the individual electrical capacitors without damaging or destroying the electrical continuity of the various portions comprising the capacitors. That the possibility of thus cutting apart the individual units could not be predicted in advance is readily understood when it is appreciated that the thicknesses of the individual layers of vitreous enamel dielectric and metallic silver electrode areas are measured in thousandths of an inch.

Various changes might be made in my improved process, of which certain preferred embodiments are described herein, without departing from the scope of the invention. Such variations and changes in that method as are within the scope of the appended claims are intended to be included within the purview of my invention.

I claim:

1. The method of preparing an electrical capacitor of the type comprising a plurality of vitreous enamel dielectric layers separating fired silver electrode layers which comprises: building up on a temporary supporting base a plurality of alternate layers of vitreous enamel dielectric and powdered silver suspended in suitable vehicles, said layers being built up as follows: first, placing on said temporary support a layer of vitreous enamel suspended in a suitable vehicle, said vitreous enamel layer being sufficient in extent to serve for a number of individual capacitor units; applying thereto, after said vitreous enamel layer has dried, a layer of metallic silver suspended in a suitable vehicle, said layer being applied in the form of a number of individual areas, each separated from the other, said silver being sufficient in extent to provide electrode plates for a large number of individual capacitor units; applying on top of said metallic silver layer, and over such portions of said first-named vitreous enamel dielectric layer as remain uncovered, a second layer of vitreous enamel dielectric; applying on top of said second layer of vitreous enamel dielectric, after said layer has dried, a second layer of powdered silver suspended in a suitable vehicle, said layer being applied in the form of a number of individual areas spaced from each other, sufficient in extent to provide electrode plates for a large number of individual electrical capacitor units; continuing said process, applying alternate layers of vitreous enamel dielectric and alternate layers of metallic silver suspended in a suitable vehicle, until the required number of electrode plates separated by vitreous enamel dielectric layers has been built up; and then cutting said resulting structure apart, directly through said vitreous enamel layers and metallic silver layers, to provide a large number of individual electrical capacitor units.

2. The method of manufacturing electrical capacitors of the type comprising a plurality of vitreous enamel dielectric layers separating fired silver electrode layers, said method being particularly designed for building up a large number of individual electrical capacitor units in a single operation, which comprises: positioning on a temporary support a layer of powdered dielectric vitreous enamel suspended in a suitable vehicle; after said layer has dried, applying thereto a layer of silver paste, said paste comprising metallic silver suspended in a suitable vehicle and being applied in a number of individual areas, each separated from each other, on said powdered dielectric vitreous enamel layer; applying on said metallic silver layer, and on said portions of said first-named vitreous enamel dielectric layer as are not covered, a second layer of vitreous enamel dielectric; applying on said second layer of vitreous enamel dielectric a second layer of silver paste comprising metallic silver suspended in a suitable vehicle, said silver paste being applied in a number of distinct areas each separate from each other, said areas of applied silver being such as to cover the spaces between adjacent areas in said first-applied layer of silver paste; applying on top of said second layer of metallic silver, and over such portions of said second layer of vitreous enamel dielectric as are not covered by metallic silver, a third layer of vitreous enamel dielectric; repeating said process, applying alternately continuous vitreous enamel dielectric layers and silver paste layers applied in a number of distinct separated areas, until the desired number of layers necessary to form the ceramic electrical capacitor has been built up; and then cutting apart said resulting structure in such a way as to provide a number of individual electrical capacitor units, said cutting being so adapted as to cut through alternate layers of metallic silver so that each of the cut surfaces of the resulting electrical capacitors expose the end edge portions of alternate layers of metallic silver.

3. The method of manufacturing an electrical capacitor of the type comprising a plurality of vitreous enamel dielectric layers separating fired silver electrode layers, said method being particularly designed for building up a large number of individual electrical capacitor units in a single operation, which comprises: positioning on a temporary support a layer of powdered dielectric vitreous enamel suspended in a suitable vehicle; after said layer has dried, applying thereto a layer of silver paste, said paste comprising metallic silver suspended in a suitable vehicle, said paste being applied in a number of individual areas each separated from each other on said powdered dielectric vitreous enamel layer; applying on said metallic silver layer, and on said portions of said first-named vitreous enamel dielectric layer as are not covered, a second layer of vitreous enamel dielectric; applying on said second layer of vitreous enamel dielectric a second layer of silver paste comprising metallic silver suspended in a suitable vehicle, said silver paste being applied in a number of distinct areas each separate from each other, said areas of applied silver being so placed as to cover the spaces between adjacent areas in said first-applied layer of silver paste; applying on top of said second layer of metallic silver, and over such portions of said second layer of vitreous enamel dielectric as are not covered by metallic silver, a third layer of vitreous enamel dielectric; repeating said process, applying alternately vitreous enamel dielectric layers and silver paste layers applied in a number of distinct separated areas, until the desired number of layers necessary to form the ceramic electrical capacitor has been built up; and then firing the resulting individual capacitor units, cut off from said main body built-up, to provide unitary monolithic electrical capacitors of the type described.

ALDEN J. DEYRUP.